United States Patent [19]

Jaulmes

[11] 4,403,672
[45] Sep. 13, 1983

[54] DUAL LINKAGE COUPLING MECHANISM FOR A MOPED FOR ENGAGING A MOTOR DRIVEN PULLEY WITH THE MOPED REAR WHEEL

[75] Inventor: Christian Jaulmes, Paris, France

[73] Assignee: Ateliers de la Motobecane S.A., Pantin, France

[21] Appl. No.: 269,783

[22] Filed: Jun. 2, 1981

[30] Foreign Application Priority Data

Jun. 13, 1980 [FR] France .................................. 80 13140

[51] Int. Cl.³ ............................................ B62M 23/02
[52] U.S. Cl. ..................................... 180/205; 74/625; 192/142 R
[58] Field of Search ............. 180/205, 230, 315, 19 R, 180/19.1; 403/1; 74/401, 432, 625; 192/67 R, 144, 142 R; 123/90.21, 90.44, 189, 193 R; 172/125, 106

[56] References Cited

U.S. PATENT DOCUMENTS 2,689,012  9/1954  Jaulmes .............................. 180/205

FOREIGN PATENT DOCUMENTS 656722  1/1965  Belgium .
1467959 12/1965  France ................................. 180/205
2272885  5/1974  France ................................. 180/205

Primary Examiner—Joseph F. Peters, Jr.
Assistant Examiner—Mitchell J. Hill
Attorney, Agent, or Firm—Browdy & Neimark

[57] ABSTRACT

A coupling device, located between the drive part and the cycle part of a moped, wherein the crank drive is provided with a stationary double pinion, connected by an endless chain to the free-wheel pinion, which is secured to the back wheel of the moped, for driving the back wheel by either pedaling or by engine power. The axle of the crank drive passes through the hub of a trapezoidically grooved pulley which is connected by an endless belt to the drive pulley, which is driven by an engine. A mechanism, carried by the grooved pulley, makes it possible to optionally connect or disconnect the grooved pulley, and its associated double pinion, from the engine drive. This mechanism constitutes a double lever having a bent projecting nose, which lever is controlled by a pivotable control button to move the lever between a locked and unlocked position, as desired. When the engine drive is uncoupled from the rear wheel of the moped the moped can be powered by pedalling or by free wheeling.

6 Claims, 6 Drawing Figures

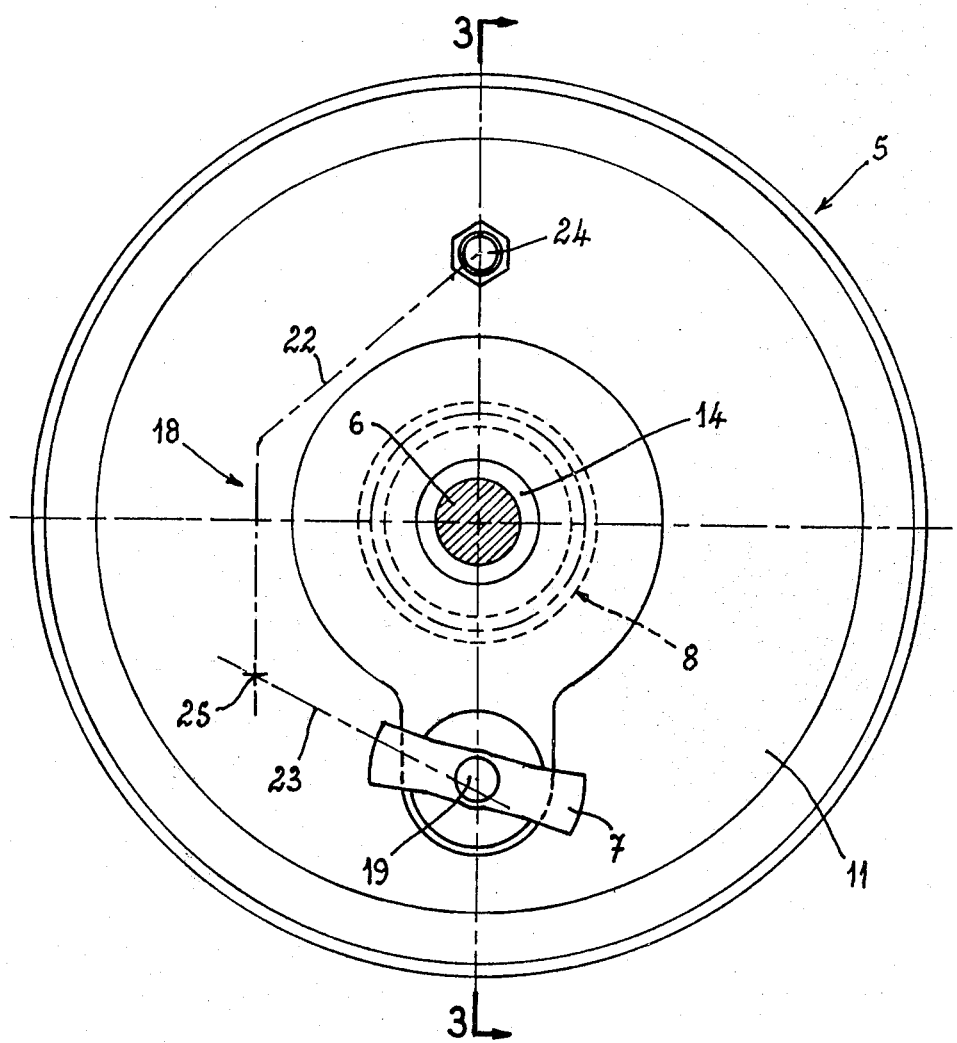

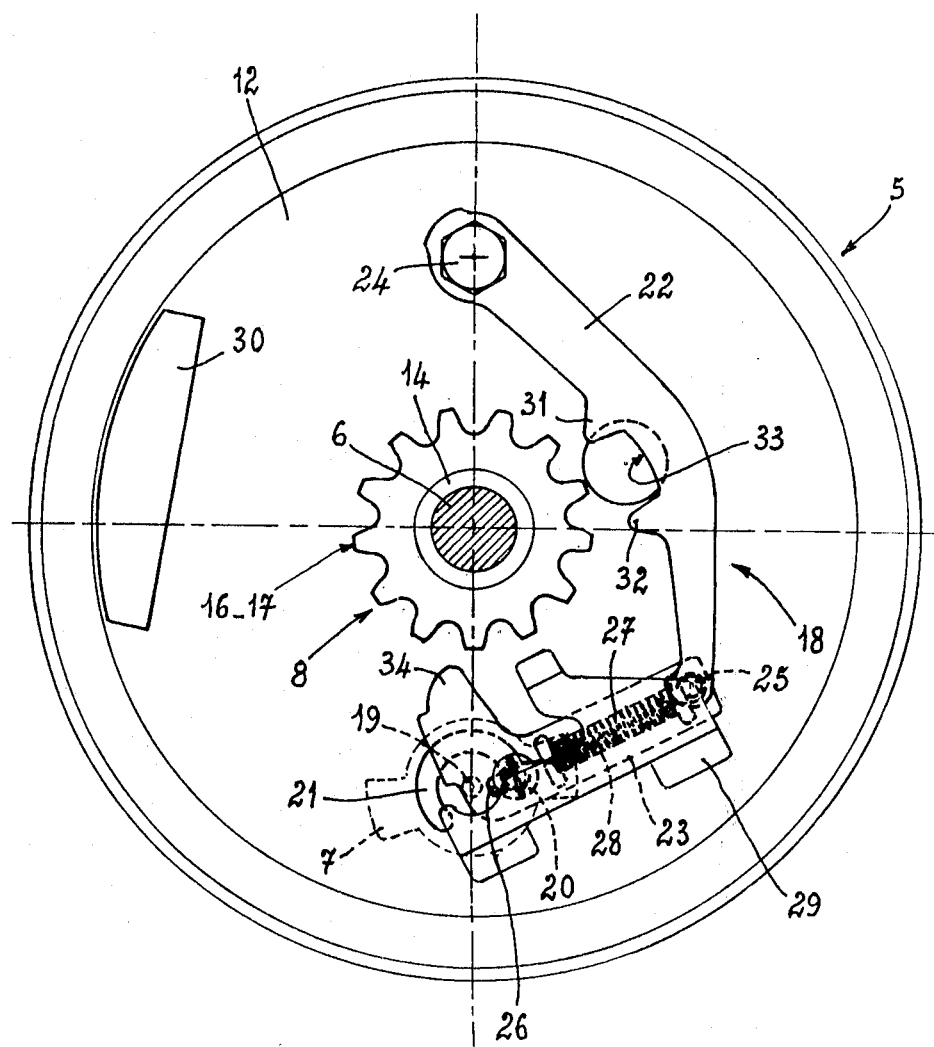

DUAL LINKAGE COUPLING MECHANISM FOR A MOPED FOR ENGAGING A MOTOR DRIVEN PULLEY WITH THE MOPED REAR WHEEL

FIELD OF THE INVENTION

This invention relates to a coupling device between the drive part and cycle part of a moped.

BACKGROUND OF THE INVENTION

More particularly, this device is of the type of those known to the prior art, in which the axle of the crank drive is provided with a stationary pinion, connected by an endless chain, to the free-wheel pinion secured to the back wheel of the moped for driving this wheel by pedaling. Furthermore, the axle of the crank drive freely passes through the hub of a pulley, having a trapezoidal groove, which is connected by an endless belt to a drive pulley driven by the engine. The device further includes a hub, on which is mounted to freely rotate, a double pinion, one of the gears of which is engaged with an endless chain connecting it to a gear which is integral with the back wheel of the moped and another gear of which works in conjunction with a mechanism carried by said grooved pulley, thus making it possible, at will, to connect or disconnect this pulley with said double pinion.

OBJECTS AND SUMMARY OF THE INVENTION

The function of this device, generally described above, is to achieve a reducing relay in the transmission between the engine and the back wheel of the moped and also to permit coupling or uncoupling between the engine and the back wheel, particularly to permit driving of the moped merely by pedaling or free-wheeling.

The mechanism carried by the grooved pulley, which permits connection or disconnecting of the pulley with the second gear of the double pinion, in some cases, constitutes a double lever. The lever comprises an element, which is articulated on the pulley and includes a catch functioning to engage with at least one tooth of the gearing of the double pinion. The lever further comprises another element, articulated at the end of the first, which other element articulates with an eccentric element controlled by a control button mounted to turn on the pulley and placed on the outside of the latter.

By making this button pivot, the user can move the double lever between a first locked position, in which, for example, the two catches, provided on one of the levers, engage with one or two teeth of the second gearing of the double pinion, and a second unlocked position. In the unlocked position the catches of the lever are separated from this gearing, which obviously serves to uncouple the engine from the back wheel of the moped.

During maneuvering of the control button, which functions to make the coupling device move from the unlocked position to the locked position, interlocking can be difficult or uncertain if the catches of the lever are not brought exactly opposite the complementary notches existing between the teeth of the double pinion. It is therefore an object of the invention to improve the operation of this known coupling device to permit easy and sure interlocking of the catch or catches of the locking lever with the second gearing of the double pinion because of automatic preselection of the positioning of this pinion.

The two elements of the double lever, being respectively designated below by the expressions "locking lever" and "control lever," function to achieve the essential characteristic of the device. Accordingly, an object of the invention resides in the fact that the control lever is structured to comprise a nose generally turned toward the crank axle and which, in the locking or unlocking position of the device, is located in withdrawn position in relation to the second gearing of the double pinion. When the locking lever is, by its notch or notches, either engaged or disengaged with said gearing, this nose, on the other hand, momentarily engages with said gearing when the control button is turned from the unlocking position to the locking position and causes, during this momentary engagement, a rotational movement of the double pinion around the hub of the pulley so that the meshing tooth or teeth of the second gearing are brought exactly opposite the catch or catches of the locking lever.

The above-described device facilitates the engagement of the catches of the locking lever with the second gearing of the double pinion utilizing extremely simple means since neither the double pinion, the control button nor the locking lever are modified. The only addition to the device structure consists of a nose that can be made integral with the control lever and, of course, would be correctly dimensioned and positioned to engage momentarily with the second gearing of the double pinion and to bring this latter mechanism exactly into the desired position.

In a particular embodiment of the invention, this control lever is extended beyond its articulation point on the eccentric element, which is linked to the control button, the projecting nose of the control lever having a generally bent shape.

In any case, the invention will be better understood from the following description, with reference to the accompanying diagrammatic drawing representing, by way of nonlimiting example, an embodiment of the coupling device:

BRIEF DESCRIPTION OF THE DRAWINGS

FIG. 2 shows, on a larger scale, the pulley with which the device is associated, as seen from the outside;

FIG. 4 represents the pulley of the preceding figures, seen from the inside, the coupling device being in unlocked position;

DETAILED DESCRIPTION OF THE PREFERRED EMBODIMENTS

Figure 1:
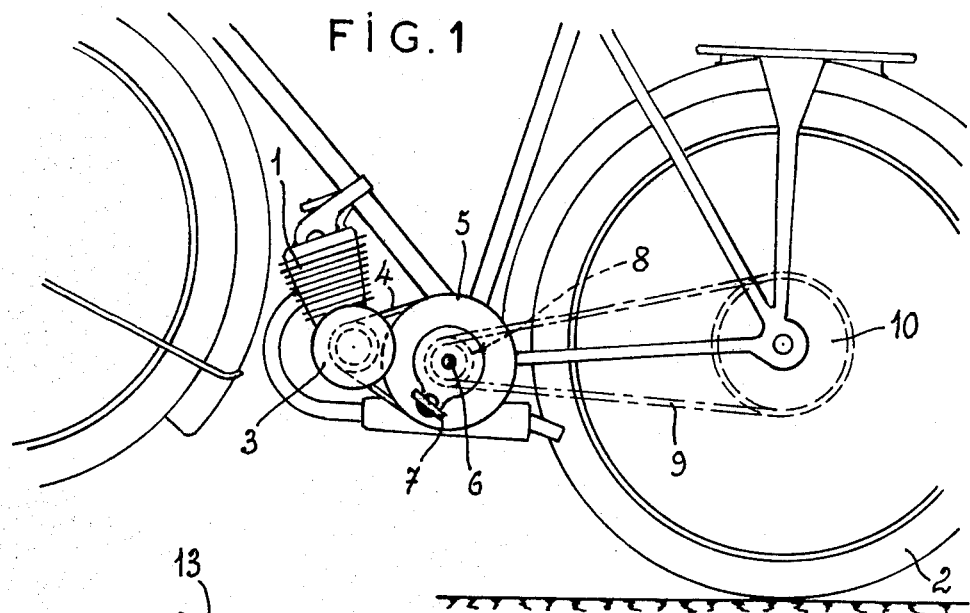
FIG. 1 partially represents a moped and shows the latter's transmission unit.

FIG. 1 shows the transmission system which is usually provided between engine 1 and the back wheel 2 of a moped. A drive pulley 3, directly driven by engine 1 drives, by means of a trapezoidal endless belt 4, a pulley 5, of relatively large diameter, which turns on axle 6 of the crank gear. This pulley 5 can be coupled or uncoupled, by maneuvering a locking button 7 mounted to turn on pulley 5, with a double pinion 8 on which passes an endless chain 9, which drives a toothed wheel 10 axially rotationally connected to back wheel 2 of the moped. For clarity in the illustrative drawing, the purely "cycle" part comprising the pedals and a second endless chain connecting axle 6 of the crank gear to back wheel 2 by a free-wheel pinion, has been omitted from the showing in FIG. 1, this part being of well known structure and not being modified by this invention.

Figure 3:
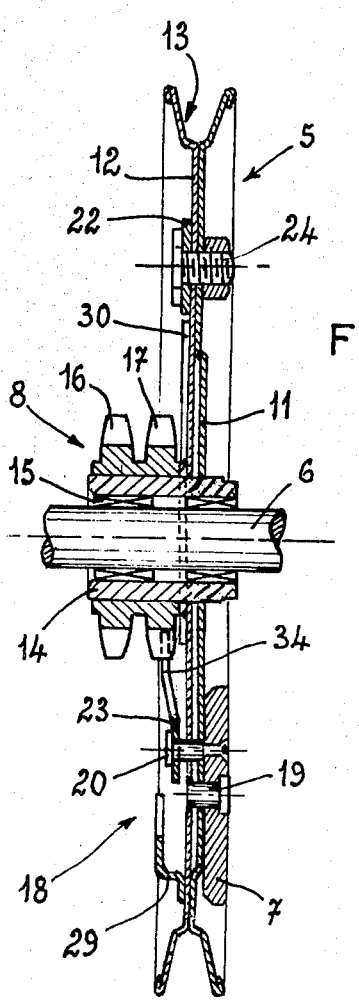
FIG. 3 is a view in cross section of this pulley and of the associated device, along line 3—3 of FIG. 2.

As FIG. 2 and the following figures show, pulley 5 comprises, two side-by-side flanges 11 and 12, which are separated from one another on their periphery to form a trapezoidal groove 13 which receives a belt 4. The pulley further includes a hub 14, through which axle 6 of the crank gear freely passes, needle type bearings 15 having been interposed within the hub. On the inside, i.e., the portion turned toward the median plane of the moped, hub 14 forms a relatively large projection, on which double pinion 8 is mounted to rotate freely. As FIG. 3 shows, more particularly, gear tooth 16 of double pinion 8, which is farthest from flanges 11 and 12 of pulley 5, is engaged with an endless chain 9. The other gear tooth 17 of double pinion 8, i.e., the one located in the immediate proximity of flanges 11, 12 of pulley 5, works in conjunction with a mechanism 18 carried by this pulley 5, which is more particularly affected by this invention.

In this mechanism 18, locking button 7, mentioned, above, is mounted to turn around a shaft 19 on flange 11, 12 of pulley 5, shaft 19 being parallel to axle 6 of the crank drive. Button 7, located on the outside of pulley 5, comprises an eccentric crankpin 20 which can be made, for example, in the form of a simple screw which passes through flanges 11, 12 of the pulley, by way of slot 21 defining an arc of a circle, and projects toward on the inside of pulley 5.

Mechanism 18 further comprises two levers 22 and 23. The first lever 22 has one of its ends articulated on pulley 5, around a shaft 24, diametrically opposite shaft 19 of locking button 7. The other end of first lever 22 is articulated, about a shaft 25, to one end of second lever 23. Near its other end, this second lever 23 comprises an oblong hole 26 through which a crankpin 20 passes. A tension spring 27, housed in a recess 28 of second lever 23, also connects crankpin 20 to the shaft of articulation 25 located between the two levers 22 and 23. Pulley 5 further carries a flange 29 for holding and guiding levers 22 and 23 and a flyweight 30 functioning to balance the unit, as part of the combination including a mechanism.

First lever 22 of this mechanism 18 comprises, in its central part and on the side turned toward shaft 6 of the crank drive, two locking teeth or catches 31, 32, separated by a housing or notch 33, which housing is able to receive two consecutive teeth of gearing 17 of the double pinion 8.

According to this invention, second lever 23, having the function of a control lever, is structured to possess a generally bent shape extending beyond a portion of the lever which has an oblong hole 26. The lever achieves articulation on crankpin 20 by means of a nose 34 turned generally in the direction of axle 6 of the crank drive.

The device is represented in the unlocked position in FIGS. 2 and 4, i.e., the portion in which pulley 5 and double pinion 8 are uncoupled, which also uncouples engine 1 from back wheel 2 of the moped and permits the use of the latter as a simple pedal powered cycle. Button 7 is then in one of its extreme positions (determined by the engagement of crankpin 20 with one end of slot 21). Lever 23 is shoved back and holds lever 22 away from double pinion 8 so that locking teeth or catches 31, 32 of this lever 22 are disengaged from gearing 17 of double pinion 8. In this position, nose 34 also is withdrawn in relation to gearing 17 of double pinion 8.

Figure 5:
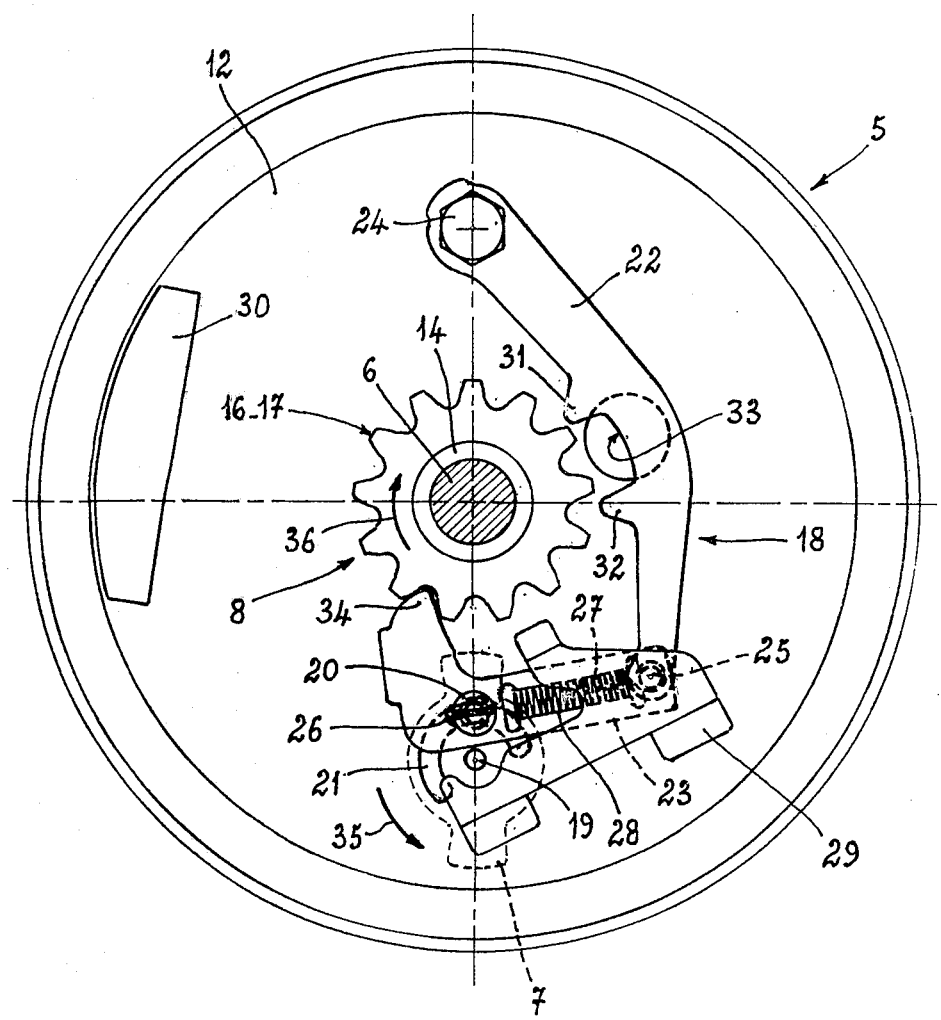
FIG. 5 is a view similar to FIG. 4, showing the coupling device during the locking operation.

To bring the device to its locked position, button 7 is turned in the direction indicated by arrow 35 in FIG. 5. During this operation, crankpin 20 describes a movement along slot 21 in an arc of a circle, so that control lever 23 is both drawn and brought close to axle 6 of the crank drive. Nose 34 of this lever 23 also describes a curved path during which it momentarily engages with gearing 17 of double pinion 8. The engagement occurs a brief moment before teeth or catches 31, 32 of lever 22 reach the same gearing 17, and it causes a rotating movement of double pinion 8 in the direction of arrow 36. When nose 34 is separated from gearing 17, two teeth of the latter are thus automatically brought exactly opposite recess 33 located between two teeth or catches 31, 32, of lever 22.

Figure 6:
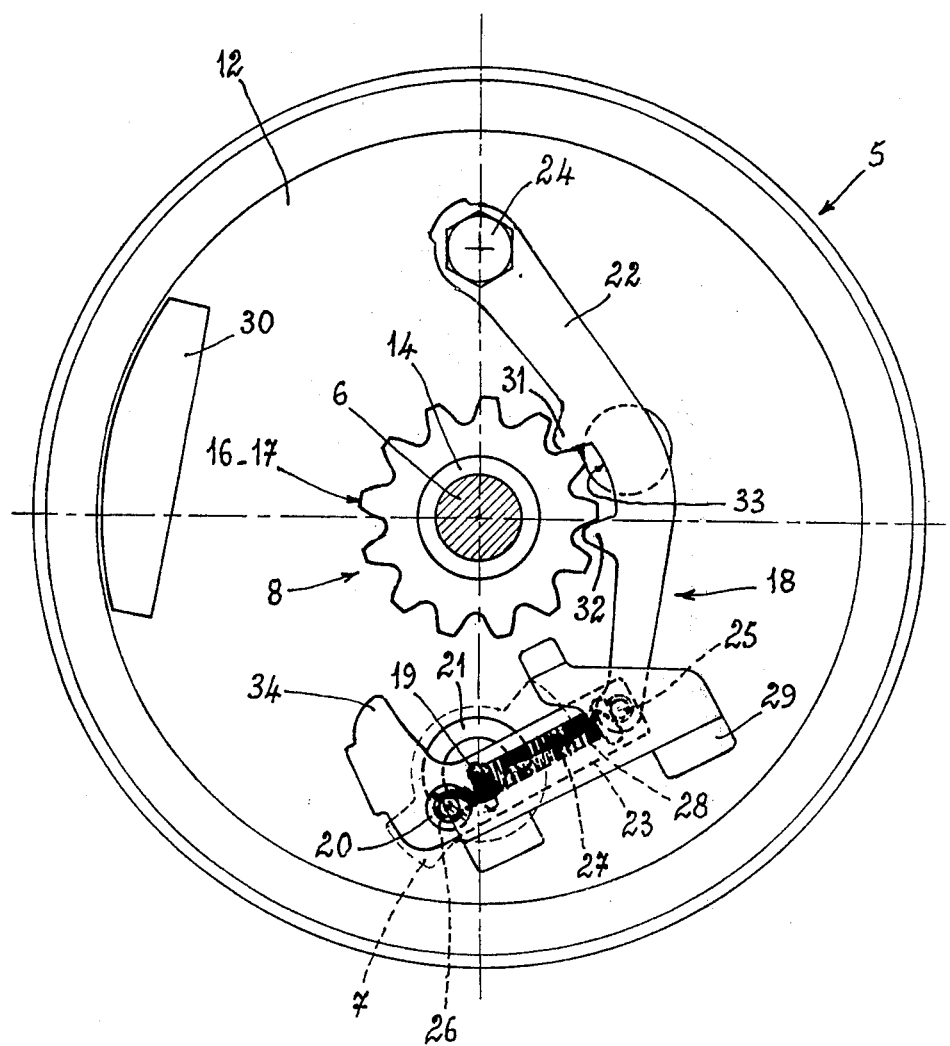
FIG. 6 is a view similar to FIGS. 4 and 5 showing the coupling device in the locked position.

The rotation of button 7 continuing, lever 22 is moved so that the two affected teeth of gearing 17 are introduced into recess 33. Because of the action of tension spring 27, button 7 goes through a "hard point," before being immobilized by the striking of crankpin 20 at the other end of the slot 21. The device is then in locked position, shown in FIG. 6. In the locked position, lever 22 is engaged with gearing 17 of double pinion 8 by its teeth or catches 31, 32 but nose 34 is again located in a withdrawn position in relation to this gearing 17.

During the reverse uncoupling operation, nose 34, of course, goes through the same intermediate positions, but without any particular effect occurring therefrom.

It is apparent that the invention is not limited to the single embodiment of this coupling device which has been described above by way of example; on the contrary, it takes in all variants known to those of ordinary skill in the art, particularly in regards to the details of form of the various parts of the device.

Thus, for example, oblong hole 26, which is provided at one end of control lever 23, could just as well be made at the other end of lever 23.

It will therefore be understood that changes and modifications may be made to the above-described device by those skilled in the art without departing from the spirit and scope of the invention disclosed in the instant application.

I claim:

1. In a moped having a motor, a rear wheel, a rotatable pedal crank including an axle carrying pinion gear means rotatable with said crank axle for drivingly coupling the axle with the rear wheel, and a pulley, driven by the motor, for rotation about the axle, a coupling mechanism for selectively coupling the pulley with the pinion gear means, comprising:

a first lever having first and second ends, said first end being pivotably connected to said pulley, said first lever including means, disposed between said first and second ends, for selectively engaging said pinion gear means to, whereby selectively lock the pulley to the pinion gear means;

a second lever having first and second ends, said second lever being pivotably connected to said pulley, said first end of said second lever including a nose portion for selective engagement with said pinion gear means, the second ends of said first and second levers being pivotably interconnected to each other; and actuating means, rotatably connected to said pulley and connected to said second lever, said actuating means including means for moving said coupling mechanism,
- (1) from a first position in which said first lever engaging means and said second lever nose portion are disengaged from said pinion gear means,
- (2) to a second position in which said first lever engaging means is disengaged from said pinion gear means and said second lever nose portion is engaged with said pinion gear means, and then
- (3) to a third position in which said first lever engaging means is engaged with said pinion gear means and said second lever nose portion is disengaged from said pinion gear means, whereby said coupling mechanism smoothly, efficiently and positively couples said engine with said back wheel.

2. The coupling mechanism of claim 1, wherein said pinion gear means comprises first and second pinion gears disposed in parallel, side-by-side relationship, the first gear being coupled to said rear wheel and the second gear being engaged by the nose portion of said second lever.

3. The coupling mechanism of claim 2, wherein said first lever engaging means comprises a notch for mating engagement with at least one tooth of said second pinion gear.

4. The coupling mechanism of claim 1, wherein said pulley carries a first pivot about which said actuating means is rotatably mounted, and includes slot means disposed about said first pivot, said actuating means including a pin extending through said slot means and being connected to said second lever, whereby upon rotation of said actuating means about said first pivot, said nose portion of said second lever is guided by the geometry of said slot means into the first, second and third positions.

5. The coupling mechanism of claim 4, wherein said slot means defines a substantially semi-circular slot positioned concentrically about said first pivot, and said pin is disposed eccentrically about said first pivot.

6. The coupling mechanism of claim 4, wherein said pulley carries a second pivot, said first lever first end being pivotally connected about said second pivot, said first and second pivots being located on opposite sides of said crank axle, and defining with said axle an imaginary diametrically extending line, said pin being disposed on said imaginary line when said nose portion is in engagement with said pinion gear means.

* * * * *